United States Patent
Kohli et al.

(10) Patent No.: US 6,291,092 B1
(45) Date of Patent: Sep. 18, 2001

(54) SEALING FRITS

(75) Inventors: Jeffrey T. Kohli, Corning; Robert Morena, Caton, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/360,885

(22) Filed: Jul. 23, 1999

Related U.S. Application Data

(60) Provisional application No. 60/096,559, filed on Aug. 14, 1998.

(51) Int. Cl.[7] ............................. H01M 2/08; H01M 8/12; C03C 8/04; C03C 8/14; C03C 8/24
(52) U.S. Cl. ............................. 429/33; 429/35; 501/15; 501/17; 501/26; 501/69; 501/72
(58) Field of Search ................... 501/15, 17, 18, 501/21, 26, 32, 69, 72; 429/35, 33, 174, 185

(56) References Cited

U.S. PATENT DOCUMENTS

| | | |
|---|---|---|
| 2,688,560 | 9/1954 | Armistead . |
| 2,688,561 | 9/1954 | Armistead . |
| 2,913,345 | 11/1959 | Duncan . |
| 3,148,073 | 9/1964 | Smith . |
| 3,440,172 | 4/1969 | Albinak et al. . |
| 3,754,816 | 8/1973 | Ritze . |
| 4,106,946 | 8/1978 | Ritze . |
| 4,297,141 | 10/1981 | Tokunaga et al. . |
| 4,349,635 * | 9/1982 | Davis et al. ............... 501/26 |
| 5,204,291 * | 4/1993 | Nigrin ......................... 501/26 |
| 5,270,269 | 12/1993 | Hares et al. . |
| 5,273,837 * | 12/1993 | Aitken et al. . |
| 5,453,331 | 9/1995 | Bloom et al. . |
| 5,817,586 * | 10/1998 | Harada et al. ............ 501/17 |

FOREIGN PATENT DOCUMENTS

| | | |
|---|---|---|
| 900 768 * | 3/1999 | (EP) . |
| 54-032520 * | 3/1979 | (JP) . |
| 63-35465 | 2/1988 | (JP) . |

* cited by examiner

Primary Examiner—David R Sample
(74) Attorney, Agent, or Firm—Kees van der Sterre; Milton M. Peterson

(57) ABSTRACT

These sealing glass frits are a class of frits that seal in the intermediate temperature range of 600°–800° C. The frits are based on high strain point/high CTE alkali-zinc-silicate glass compositions. The sealing frits are useful in planar solid oxide fuel cells (SOFC).

3 Claims, 2 Drawing Sheets

SEALING FRITS

This application claims the benefit of U.S. Provisional Application No. 60/096,559 filed Aug. 14, 1998, entitled "Sealing Frits", by Kohli et al.

TECHNICAL FIELD

This invention relates to sealing frits such as alkali-zinc silicate frits. More specifically, the frits are sealing frits for solid oxide fuel cells (SOFC).

BACKGROUND ART

Frist which seal in the temperature range of 600°–1000° C. represent an intermediate class of materials between the $B_2O_3$- or $P_2O_5$-based frits used for low temperature sealing of many commerical glass products and the diversifying frits used for high temperature joining of advanced ceramic, structural components. The low temperature frits are used at temperatures below 600° C. for sealing products such as cathode ray tubes (CRT), light bulbs and the like. The diversifying high temperature frits are used at temperatures above 1,000° C. to produce articles which may embody high temperature, fiber-reinforced, structural ceramics.

A very old product in the intermediate temperature range of sealing is a $ZnO$—$B_2O_3$—$SiO_2$ frit. Another is a $Li_2O$-modified, $ZnO$—$Al_2O_3$—$SiO_2$ frit designed for use between 900°–1,000° C. Frits that seal in the intermediate range of 600°–800° C. are important in many industrial applications. The need for such frits became evident through requests for sealant frits for solid oxide fuel cells (SOFC).

DISCLOSURE OF INVENTION

In response to the demands of the market place, we have invented a class of alkali-zinc-silicate frits that produce seals in the intermediate temperature range of 600–1000. These frits are high strain point/high CTE frits that are $B_2O_3$ free. They have properties that make them especially useful for planar SOFC applications. These properties are:

- mechanical and chemical stability at 750°–800° during operation of the fuel cell;
- sealing temperature up to 12000 ° C.;
- effective barrier against the permeation of hydrogen gas; and
- CTE in the range of $100$–$120 \times 10^{-7}$/° C.

The combination of high viscosity and high coefficients of thermal expansion (CTE) is a somewhat contradictory requirement for a glass composition. Most high temperature sealing frits typically possess a combination of high viscosity and low CTE.

BEST MODE OF CARRYING OUT INVENTION

Figure 1:
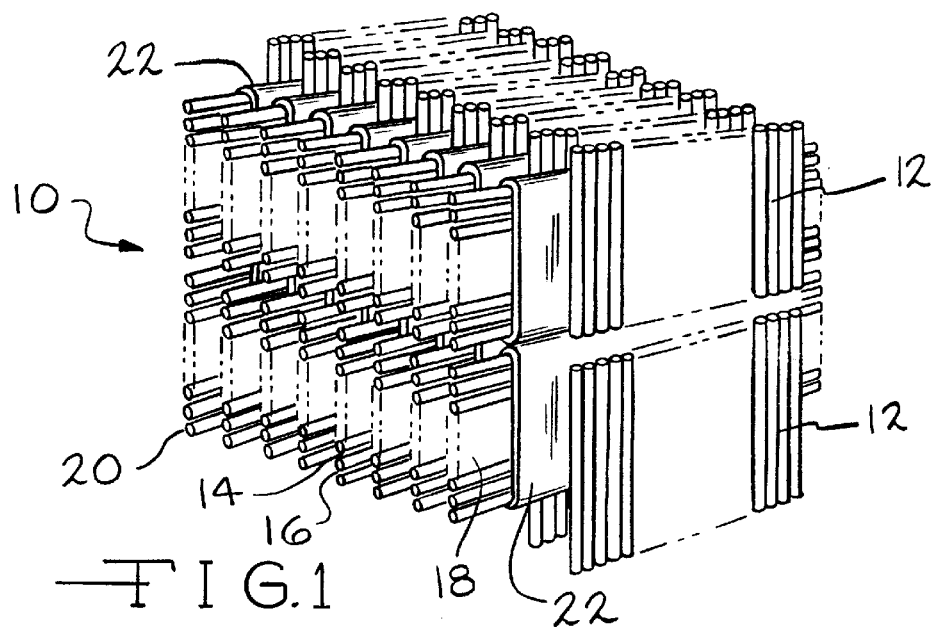
FIG. 1 is a perspective view of a stack of solid oxide fuel cells (SOFC).
Figure 2:
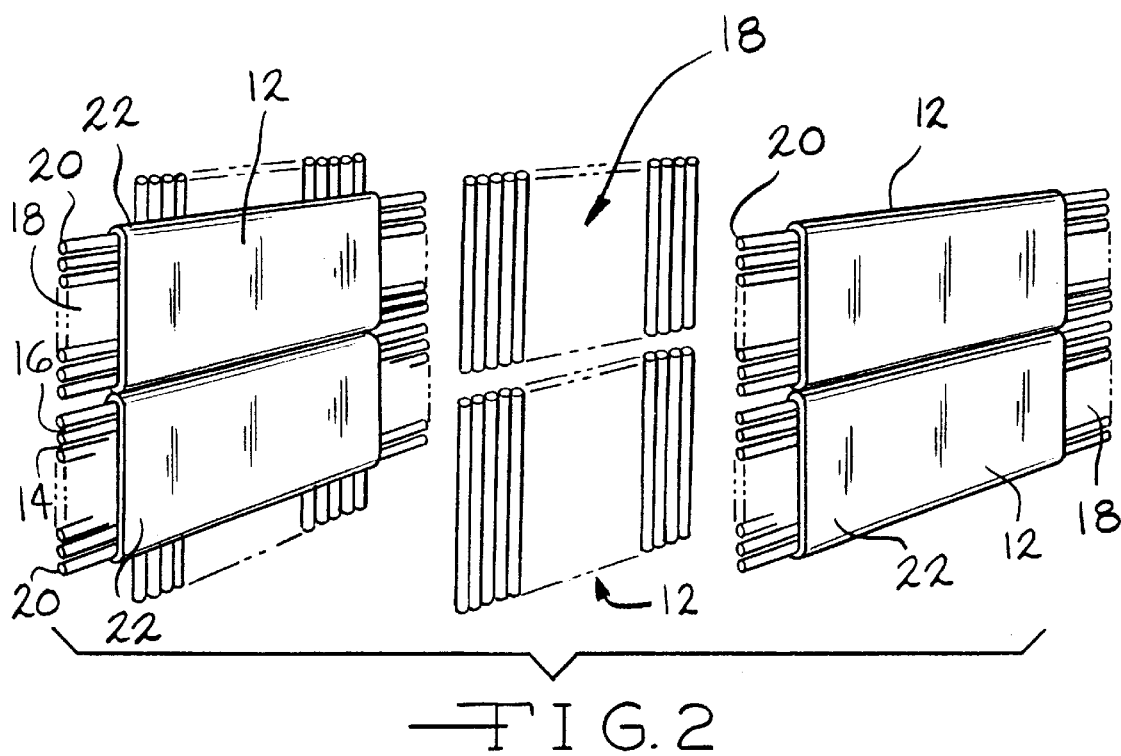
FIG. 2 is an exploded, perspective view of the stack of SOFCs.

FIGS. 1 and 2 are perspective views of a typical SOFC. This SOFC consists of alternating, unit cells composed of layers of a solid electrolyte, cathode and anode plates. The solid electrolyte generally is yttrium (Y) - doped $ZrO_2$.

FIGS. 1 and 2 show SOFC 10 including stacked, unit cells 12. Unit cells 12 include anodes 14, cathodes 16 and an electrolyte (not shown).

Each cell 12 comprises distribution member 18 which embodies a plurality of parallel passages 20 for the supply of electrolyte, oxidant or fuel. The axes of passages 20 lie in a common plane.

Distribution member 18 is preferably manufactured from two corrugated, ceramic plates. The corrugations of the plates are arranged parallel, and the troughs of one of the plates are bonded to the peaks of the other plate. This forms passages 20 which have a diameter on the order of 2 mm.

Porous support structure 22 surrounds and extends transversely of distribution member 18. It contacts the peaks and the troughs of member 18 to form a plurality of parallel passages which are anode 14 or cathode 16 chambers of solid oxide fuel cell stack 10. They provide the distribution and removal of the electrolyte for solid oxide fuel cells 10. The corrugated ceramic plates have apertures between passages 20 to allow fuel to flow from passages 20 into anode 14 or cathode 16 chambers of solid oxide fuel cells 10.

Figure 3:
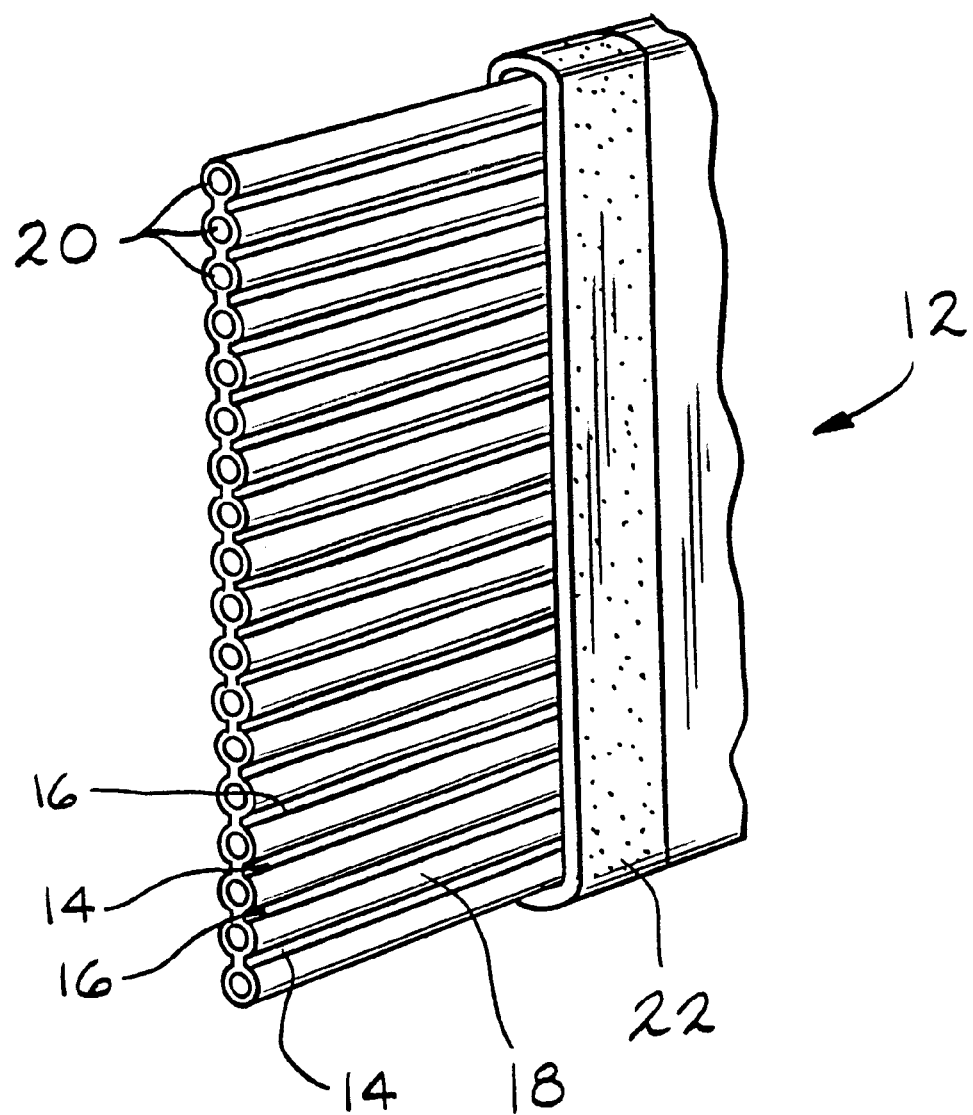
FIG. 3 is an exploded, fragmentary view of an SOFC.

FIG. 3 is an exploded, fragmentary view showing anodes 14 and cathodes 16 and their relationship to passages 20.

The glass frits of this invention may encapsulate each cell 12, or they may form a barrier between each cell 12. When forming a barrier, the glass frits will take the form of a plate sandwiched between adjacent cells 12. Structure 22 also may be made of the glass frits of this invention. The sealing frits prevent hydrogen gas from diffusing from one cell 12 to another.

The sealing frits of this invention do not contain $B_2O_3$ and consist essentially of, by weight percent:

|  | Alkali-Zinc Silicate |
| --- | --- |
| $SiO_2$ | 50–70 |
| $Al_2O_3$ | 0–5 |
| $Li_2O$ | 0–5 |
| $Na_2O$ | 2–10 |
| $K_2O$ | 5–15 |
| $ZnO$ | 10–25 |
| $BaO$ | 0–10 |
| $TiO_2$ | 0–5 |
| $ZrO_2$ | 0–10 |

Preferably, the sealing frits consist essentially of, by weight:

|  | Alkali-Zinc Silicate |
| --- | --- |
| $SiO_2$ | 55–65 |
| $Al_2O_3$ | 0–3 |
| $Li_2O$ | 0–4 |
| $Na_2O$ | 2–8 |
| $K_2O$ | 5–10 |
| $ZnO$ | 15–20 |
| $BaO$ | 0–5 |
| $TiO_2$ | 0–5 |
| $ZrO_2$ | 0–6 |

The weight percents herein are calculated from the glass batch on an oxide basis. All temperatures herein are given in Celsius (° C.).

EXAMPLE

TABLE I shows several glass compositions for high strain point/high CTE glasses. The data shown are for three examples of alkali-zinc-silicate glass compositions. Each of the compositions was chosen for remaking as a frit because the values of softening point and CTE (RT-300°) reported for the bulk glass exceeded the minimum required values, respectively, 6500° C. and $90\times10^{-7}/°$ C. After melting, each composition was made into a frit by dry ball-milling to a mean particle size of 10–20μm.

Small cylinders were then hand-pressed for the evaluation of flow performance. Bars for CTE and viscosity measurements were made by pressing such shapes using a hydraulic press. All test specimens were fired to the indicated thermal cycle and then evaluated for properties. In the case of flow performance, a rating of "very good" meant that the frit flowed to such an extent that the initial 12 mm diameter increased to at least 25 mm upon firing.

The alkali-zinc-silicate frits did not undergo any substantial crystallization prior to flow, and consequently exhibited substantial flow. The relatively good agreement between bulk glass and fired frit properties further indicates that the frit remained vitreous during the firing treatment.

The data in TABLE I show that these alkali-zinc-silicates are excellent sealing frits for many applications in the temperature range of 600°–1000° C. The data in TABLE I also indicate that the alkali-zinc-silicates have the potential for use in a solid oxide fuel cell. They have the desired CTE, but their softening points are marginal to meet the strict requirement of mechanical stability at 750°–800°. These compositions did serve, however, as the basis for attempts to increase viscosity through devitrification. Other potential applications for high CTE frits are coatings for bonding to a particular substrate at a temperature no greater than 1000°–1100°. This requirement puts an upper limit of the softening point of approximately 850°–900°.

The $R_2O$—$ZnO$—$SiO_2$ compositions set forth in TABLE I are illustrative of the present invention. Batches, based on these compositions were mixed, melted and poured in conventional manner to provide test pieces for measurement. Compositions 1, 5 and 8 are base compositions in which the ZnO content was gradually increased, typically at the expense of $SiO_2$ and/or total $R_2O$. Also, $Li_2O$ was replaced by $Na_2O$.

The remaining compositions (2–4, 6, 7 and 9) were formulated in an attempt to obtain an increased softening point by means of glass devitrification. Thus, a three mole % addition of a potential crystallization agent, selected from $ZrO_2$, $ZrSiO_4$ and $TiO_2$, was added to the batches of base glass compositions 1, 5 and 8. The amounts are shown in weight % in TABLE I for consistency. $ZrO_2$ was added to composition 1 to form composition 2. $ZrSiO_4$ was added to compositions 1, 5 and 8 to form compositions 3, 6 and 9, respectively. $TiO_2$ was added to compositions 1 and 5 to form compositions 4 and 7, respectively.

TABLE I lists the measured CTE and softening point for each composition in bulk glass form, after first annealing at 575° C. In addition, properties are also listed for several of the glasses after they were made into frits. These glasses were ball-milled to a 15–20μm powder, dry-pressed into a disk or bar, sintered at 800° C. for one hour, and then sawed or drilled into the required shape for the property measurement.

The data in TABLE I indicate that the are higher in softening point than the initial additive-free compositions. Within each of the three sets, the highest softening point was attained with 3 mole % addition of $ZrSiO_4$ to the initial frit. The three $ZrSiO_4$-containing compositions (#s 3, 6 and 9) were ball-milled so that properties could be determined on them as frit batch. Also included in this study were the parent base frits. As frits, all three of the compositions were significantly higher in softening point than was the initial frit. Of the three compositions to which $ZrSiO_4$ was added, composition 9 in TABLE I, with the CTE of $101.3\times10^{-7}/°$ C., was preferred.

In an effort to provide higher temperature sealing materials for use as fuel cell sealants, potential crystallization catalysts were also blended into samples of the composition 9 frit as mill additions. The crystallization catalysts selected

TABLE I

Compositions for High Strain Point/High CTE Frits

| Weight Basis % | 1 | 2 | 3 | 4 | 5 | 6 | 7 | 8 | 9 |
|---|---|---|---|---|---|---|---|---|---|
| $SiO_2$ | 62.2 | 58.9 | 58.9 | 60.0 | 62.2 | 58.7 | 59.8 | 59.4 | 56.3 |
| $Al_2O_3$ | 1.6 | 1.5 | 1.5 | 1.5 | 1.6 | 1.5 | 1.5 | 2.0 | 1.9 |
| $Li_2O$ | 2.3 | 2.2 | 2.2 | 2.2 | 1.0 | 0.9 | 0.9 | — | — |
| $Na_2O$ | 4.7 | 4.5 | 4.5 | 4.6 | 7.5 | 7.1 | 7.3 | 7.7 | 7.3 |
| $K_2O$ | 7.2 | 6.8 | 6.8 | 6.9 | 7.1 | 6.8 | 6.9 | 11.7 | 11.1 |
| ZnO | 17.3 | 16.4 | 16.4 | 16.7 | 18.5 | 17.5 | 17.9 | 19.2 | 18.2 |
| BaO | 4.7 | 4.4 | 4.4 | 4.5 | 2.3 | 2.2 | 2.2 | — | — |
| $TiO_2$ | — | — | — | 3.5 | — | — | 3.5 | — | — |
| $ZrO_2$ | — | 5.3 | 5.3 | — | — | 5.3 | — | — | 5.2 |
| Physical Properties | | | | | | | | | |
| Bulk Glasses (Annealed @ 575° C.) | | | | | | | | | |
| CTE (RT-300°) | 89.2 | 82.0 | 83.1 | 87.0 | 93.7 | 89.0 | 91.8 | 104.5 | 97.6 |
| Softening Pt., ° C. | 667 | 711 | 714 | 668 | 692 | 739 | 696 | 740 | 786 |
| Frits (Sintered @ 800°/1 hr.) | | | | | | | | | |
| CTE (RT-500°) | 106.8 | — | 92.5 | — | — | 93.6 | — | — | 101.3 |
| Softening Pt., ° C. | 681 | — | 781 | — | — | 733 | — | — | 783 | for blending were zirconia and alumina. The zirconia used had a mean particle size of approximately 3–5μm. The alumina used was a reactive aluminum oxide with a mean particle size <0.5μm, although there is good reason to believe that other commercial aluminas could as well be used for this purpose.

The samples were ball-milled to a mean particle size of 15–20μm, and then blended on a 90:10 proportion (wt. basis) with the zirconia, and the alumina, mill additions. Flow buttons were made form these mixtures by hand-pressing 5 g of powder into small cylinders (1.25 cm cliam. ×2.5 cm tall) and firing at 1000° C. for one hour. Also included was a flow button of frit powder without any mill addition (straight frit). After firing, the flow properties of the mixtures, and of the straight frit, were compared to obtain a qualitative estimate of frit viscosity. Both the straight frit and the zirconia blend showed substantial flow during the 1000° C. firing. This indicated that, at the particular loading level and/or particle size employed, zirconia did not increase viscosity as well as alumina. The flow button for the alumina mixture was, by contrast to the zirconia blend, well-sintered. Only moderate slumping took place during the 1000° C. firing. X-ray diffraction data were obtained from runs made on fired, frit bodies containing alumina as a mill addition. These data indicated that leucite ($K_2O$—$Al_2O_3$—$4SiO_2$), a compound having a high CTE, was formed during firing.

TABLE II sets forth several potential sealing materials for which comparative properties are recorded. Materials A and B were based on composition 9 of TABLE I, that is, without any mill additions. Materials C through F represent blends of composition 9 with varying amounts of the reactive alumina as a mill addition. The ratio of the glass of composition 9 to alumina in weight % is shown for each material.

Shown are the composition, the sintering temperature, the relative amount of flow, the measured CTE, and the softening point for each sintered blend. The sintered blends made with levels $\geq$10% appeared decidedly crystalline. The softening point increased for all levels of addition.

The CTE increased with increasing addition, except for the 95:5 blend containing 5% by weight $Al_2O_3$. The decreased CTE for this blend indicates that the presumed crystallization mechanism does not occur at this low a level of alumina addition. Rather, the lowered expansion, expected from a rule-of-mixture standpoint with the addition of alumina having a CTE of $70\times10^{-7}$/° C., occurs.

One blend with 10% loading, Example D in TABLE II, appears especially attractive as a sealing frit for solid oxide fuel cells. RT as used herein is room temperature at about 25° C.

Examples E and F indicate that, while the present frits are mid-temperature frits, they may become useful at higher sealing temperatures with the alumina mill addition.

TABLE II

Properties of Alumina Blends

| Ex | Composition Weight Basis | Firing Schedule | Flow Behavior | CTE, RT-500 | Softening Point |
|---|---|---|---|---|---|
| A | 100 #9 | 1000°/1 hr. | melted | — | — |
| B | 100 #9 | 800°/1 hr. | excellent | 101.3 | 783° |
| C | 95% #9<br>5% $Al_2O_3$ | 800°/1 hr. | excellent | 95.5 | 801° |
| D | 90% #9<br>10% $Al_2O_3$ | 1000°/1 hr. | slumped | 101.7 | 837° |
| E | 85% #9<br>15% $Al_2O_3$ | 1100°/1 hr. | none<br>well-sintered | 107.8 | crystalline<br>(>1150°) |
| F | 80% #9<br>20% $Al_2O_3$ | 1150°/1 hr. | none<br>well-sintered | 113.7 | crystalline<br>(1150°) |

Although the now preferred embodiments of the invention have been set forth, it will be apparent to those skilled in the art that various changes and modifications may be made thereto without departing from the spirit and scope of the invention as set forth in the following claims.

We claim:

1. A solid oxide fuel cell incorporating a sealing material forming a seal resistant to hydrogen gas permeation at a sealing temperature in the intermediate temperature range of 600°–800° C., the seal having a CTE ranging from $100–120\times10^{-7}$/° C., wherein the sealing material consists essentially of:

(i) a glass frit consisting, in weight percent, of:

| | Weight Percent |
|---|---|
| $SiO_2$ | 55–65 |
| $Al_2O_3$ | 0–3 |
| $Li_2O$ | 0–4 |
| $Na_2O$ | 2–8 |
| $K_2O$ | 6–12 |
| ZnO | 15–20 |
| BaO | 0–5 |
| $TiO_2$ | 0–5 |
| $ZrO_2$ | 0–6 | and (ii) an alumina mill addition.

2. A fuel cell in accordance with claim 1 wherein the alumina mill addition is a reactive alumina having a mean particle size less than 0.5 μm.

3. A fuel cell in accordance with claim 2 wherein the alumina mill addition comprises 10–20% by weight of the sealing material.

* * * * *